US007042207B1

(12) United States Patent
Broach

(10) Patent No.: US 7,042,207 B1
(45) Date of Patent: May 9, 2006

(54) INDUCTIVE MEASUREMENT SYSTEM AND METHOD

(75) Inventor: Michael Eugene Broach, San Mateo, CA (US)

(73) Assignee: National Semiconductor Corporation, Santa Clara, CA (US)

(*) Notice: Subject to any disclaimer, the term of this patent is extended or adjusted under 35 U.S.C. 154(b) by 101 days.

(21) Appl. No.: 10/703,960

(22) Filed: Nov. 7, 2003

(51) Int. Cl.
  *G01R 15/18* (2006.01)
(52) U.S. Cl. .................................. 324/117 R
(58) Field of Classification Search ......... 324/225, 324/227, 229, 230
  See application file for complete search history.

(56) References Cited

U.S. PATENT DOCUMENTS

| | | | |
|---|---|---|---|
| 4,127,894 A | 11/1978 | Bishop et al. | 363/56 |
| 4,439,822 A | 3/1984 | Cocconi | 363/56 |
| 4,475,083 A * | 10/1984 | Linder | 324/227 |
| 4,764,724 A * | 8/1988 | Marugg | 324/230 |
| 5,059,902 A * | 10/1991 | Linder | 324/207.17 |
| 5,270,646 A * | 12/1993 | Kihlberg et al. | 324/207.16 |
| 5,977,766 A * | 11/1999 | Linder et al. | 324/225 |
| 6,282,102 B1 | 8/2001 | Minamisawa et al. | 363/16 |
| 6,448,795 B1* | 9/2002 | Ermakov et al. | 324/724 |
| 6,577,133 B1* | 6/2003 | Barron | 324/207.16 |
| 6,661,224 B1* | 12/2003 | Linder | 324/227 |

OTHER PUBLICATIONS

"LM2621 Low Input Voltage, Step-Up DC-DC Converter," *National Semiconductor Corporation*, Feb., 2000 (10 pages).

"LM78S40 Switching Voltage Regulator Applications," *National Semiconductor Corporation*, Mar., 2000 (17 pages).

"Wide-Input, High Voltage Buck Converter," *National Semiconductor Corporation*, Sep., 2002 (3 pages).

"Introduction to Power Supplies," *National Semiconductor Corporation*, Sep., 2002 (7 pages).

"Modelling, Analysis and Compensation of the Current-Mode Converter," *Unitrode Corporation* (7 pages).

"UC3842/3/4/5 Provides Low-Cost Current-Mode Control," *Unitrode Corporation* (14 pages).

Ronald I. Birdsall, "Proceedings of Powercon7," *Power Concepts, Inc.*, Mar. 24-27, 1980 (12 pages).

* cited by examiner

Primary Examiner—Jermele Hollington
(74) Attorney, Agent, or Firm—Brett A. Hertzberg; Merchant & Gould P.C.

(57) ABSTRACT

A system and method measures parameters associated with an inductor such as in a switching converter. The inductance value can be determined by monitoring voltages and currents associated with the inductor when a measurement mode is activated. In one example, the measurement is provided by a signal processing system that includes an analog differentiator. In another example, the measurement is provided by a signal processing system that converts the analog measurement voltages into digital quantities that are analyzed in the digital domain. The value of the inductance value is determined by calculating of $\Delta V_L$ and $\Delta I_L/\Delta t$. The saturation point in the inductance is located by measuring the change in slew rate of the inductance during the measurement mode. Average values for the inductor and the slew rate can be determined using digital techniques. Other parameters such as current limit and on-time of the inductor can be adjusted by this methodology.

17 Claims, 6 Drawing Sheets

INDUCTIVE MEASUREMENT SYSTEM AND METHOD

FIELD OF THE INVENTION

The present invention relates to a system and method for detecting the saturation of an inductive component in a circuit. Slew rate of the inductive component can be monitored and/or measured to determine the saturation point for the core of the inductive component.

BACKGROUND OF THE INVENTION

Opposite polarity pulses can be applied to a transformer in a pulse-width-modulated (PWM) power converter. The secondary winding of the transformer is connected to additional circuitry such as a passive filter to generate an average output voltage. The average output voltage is related to the pulse-width by the volts-seconds rule and the characteristics of the transformer.

An example push-pull type PWM converter is illustrated in FIG. 1. As illustrated in FIG. 1, transformer T1 conducts current (IC1, IC2) from the BP power supply terminal through transistors Q1 and Q2. For example, the primary winding of transformer T1 conducts current IC1 when transistor Q1 is activated, while the primary winding of transformer T1 conducts current IC2 when transistor Q2 is activated. Diodes D1 and D2 operate on opposite polarity cycles to provide current (either ID1 or ID2) through inductor L to a load (not shown). Capacitor C0 is filter ripple in the output voltage (VO).

Ideally, transistors Q1 and Q2 are activated for equal amounts of time via drive signals DRV1 and DRV2 such that the volt-second integral of the pulses applied to the transformer corresponds to zero and the transformer core does not saturate. However, non-ideal switching times for transistors Q1 and Q2 may result in unequal cycle times such that the transformer core is driven into saturation. Core saturation in a PWM converter may result in secondary effects such as breakdown in the switching transistors (Q1, Q2), excessive voltage and current stress on the rectifier diodes (D1, D2), as well as EMI related problems.

BRIEF DESCRIPTION OF THE DRAWINGS

Non-limiting and non-exhaustive embodiments of the present invention are described with reference to the following drawings.

DETAILED DESCRIPTION OF THE PREFERRED EMBODIMENT

Figure 1:
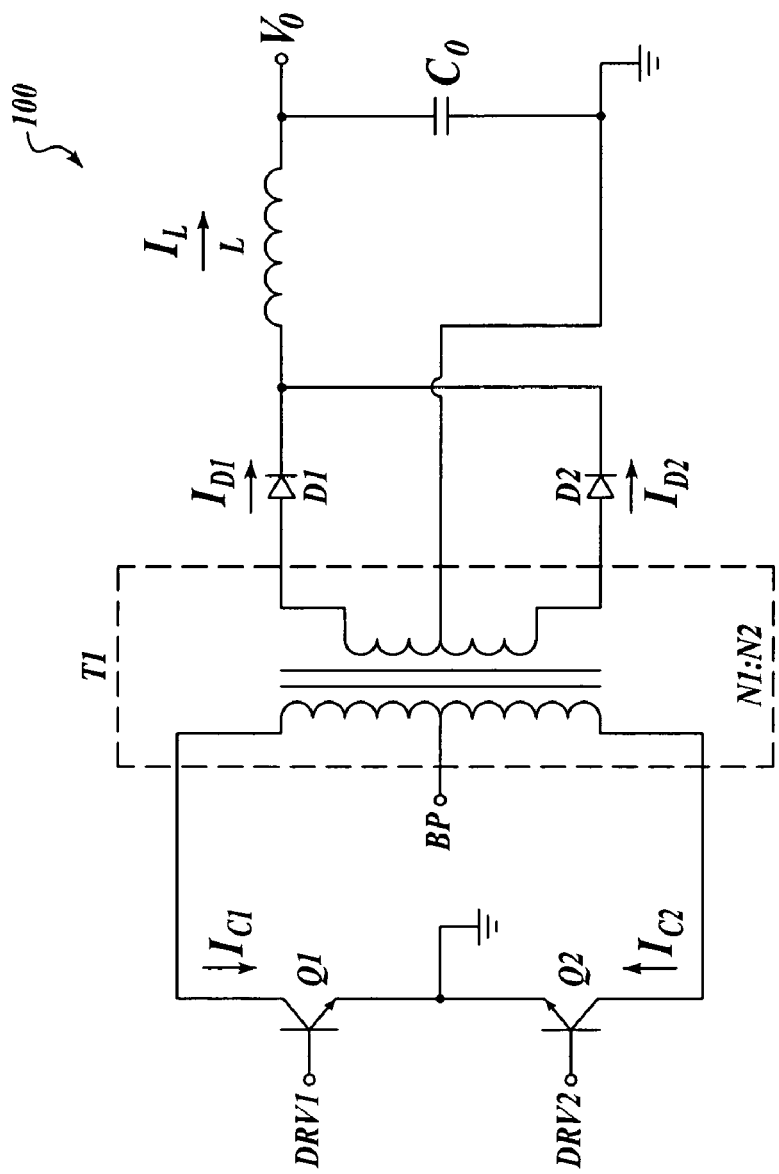
FIG. 1 is an illustration of a conventional push-pull type PWM converter.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context clearly dictates otherwise. The meanings identified below are not intended to limit the terms, but merely provide illustrative examples for the terms. The meaning of "a," "an," and "the" includes plural reference, the meaning of "in" includes "in" and "on." The term "connected" means a direct electrical connection between the items connected, without any intermediate devices. The term "coupled" means either a direct electrical connection between the items connected or an indirect connection through one or more passive or active intermediary devices. The term "circuit" means either a single component or a multiplicity of components, either active and/or passive, that are coupled together to provide a desired function. The term "signal" means at least one current, voltage, charge, temperature, data, or other signal.

Briefly stated, the invention is related to a system and method measures parameters associated with an inductor such as in a switching converter. The inductance value can be determined by monitoring voltages and currents associated with the inductor when a measurement mode is activated. In one example, the measurement is provided by a signal processing system that includes an analog differentiator. In another example, the measurement is provided by a signal processing system that converts the analog measurement voltages into digital quantities that are analyzed in the digital domain. The value of the inductance value is determined by calculating of $\Delta V_L$ and $\Delta I_L/\Delta t$. The saturation point in the inductance is located by measuring the change in slew rate of the inductance during the measurement mode. Average values for the inductor and the slew rate can be determined using digital techniques. Other parameters such as current limit and on-time of the inductor can be adjusted by this methodology.

Inductors in switching electronic circuits are typically made out of ferrites or some other core material that has a higher permittivity than air. Unlike air core inductors, the amount of current flowing in these inductors is constrained by the quality and quantity of the core material. Once the inductor's operating current exceeds a saturation point, the inductor's effectiveness is reduced and the rate of increase in the current relative to the applied voltage rises measurably. The inductor voltage ($V_L$) and the inductor current ($I_L$) are related to one another by: $\Delta I_L/\Delta t = \Delta V_L/L$.

Magnetic load applications such as motor drivers and switched-mode power supplied (SMPS) incorporate current limiting circuits to protect the control circuits (e.g., drivers, inductive elements, etc.) from currents that are sufficient to cause saturation and induce destructive currents. For example, in a SMPS the saturation current should always be greater than the current limit in the controller.

By detecting the slew rate change in the inductor current the saturation point of the inductor can be detected and an appropriate action (e.g., current limit activated) can be taken. In one example of the present invention, the slew rate of the voltage drop across the parasitic resistance of the inductor is monitored. In another example of the present invention, the slew rate of the voltage drop across a resistance in series with the inductor is monitored.

The various measurements of voltages and/or currents can be used to calculate values of characteristics associated with the inductor. Example characteristics include: inductor value, series resistance, slew rate in non-saturation, slew rate in saturation, as well as others. Inductors with different core materials have different characteristic curves (e.g., the saturation and non-saturation slew rates change based on the type of core material) such that the type of core material and the value of the inductor can be determined (e.g., a lookup table that identifies the core material type based on characteristic measurements). The characteristic measurements can also be used to in a control system such as in a switching-type converter (or regulator) to adaptively change control parameters such as: current limit, switching time, small signal compensation, and slope compensation.

Conventional circuits are often designed with various protection mechanisms to prevent damage to the circuits during operation. For example, switching circuits such as regulator and converters often have an associated current limit to protect the circuit from damage. In the present invention, characteristics associated with the inductor are measured and various control parameters associated with protection (e.g., slew rate limit, current limit, etc) in the circuit are dynamically adjusted by the control circuit to accommodate a wide range of inductor values and saturation ratings. In one example, a current limit is adjusted by dynamically adjusting a reference voltage in the control loop of the circuit using measured information. In another example, the current limit is adjusted by dynamically changing a current level in the control loop.

Conventional circuits often include compensation to prevent undesirable effects such as oscillations, or some other instability or non-linearity in the control loop. In the present invention, characteristics associated with the inductor are measured and various control parameters associated with compensation of the circuit are dynamically adjusted by the control circuit to accommodate a wide range of inductor values and saturation ratings. In one example, a parameter in the control loop is dynamically adjusted (e.g., additional current sources are enabled, a feedback amount is changed, a gain is adjusted, etc.) to change the small signal compensation associated with the inductor. In another example, a parameter in the control loop is dynamically adjusted based on the rate of discharge in the inductor to change the slope compensation for the inductor.

Figure 2:
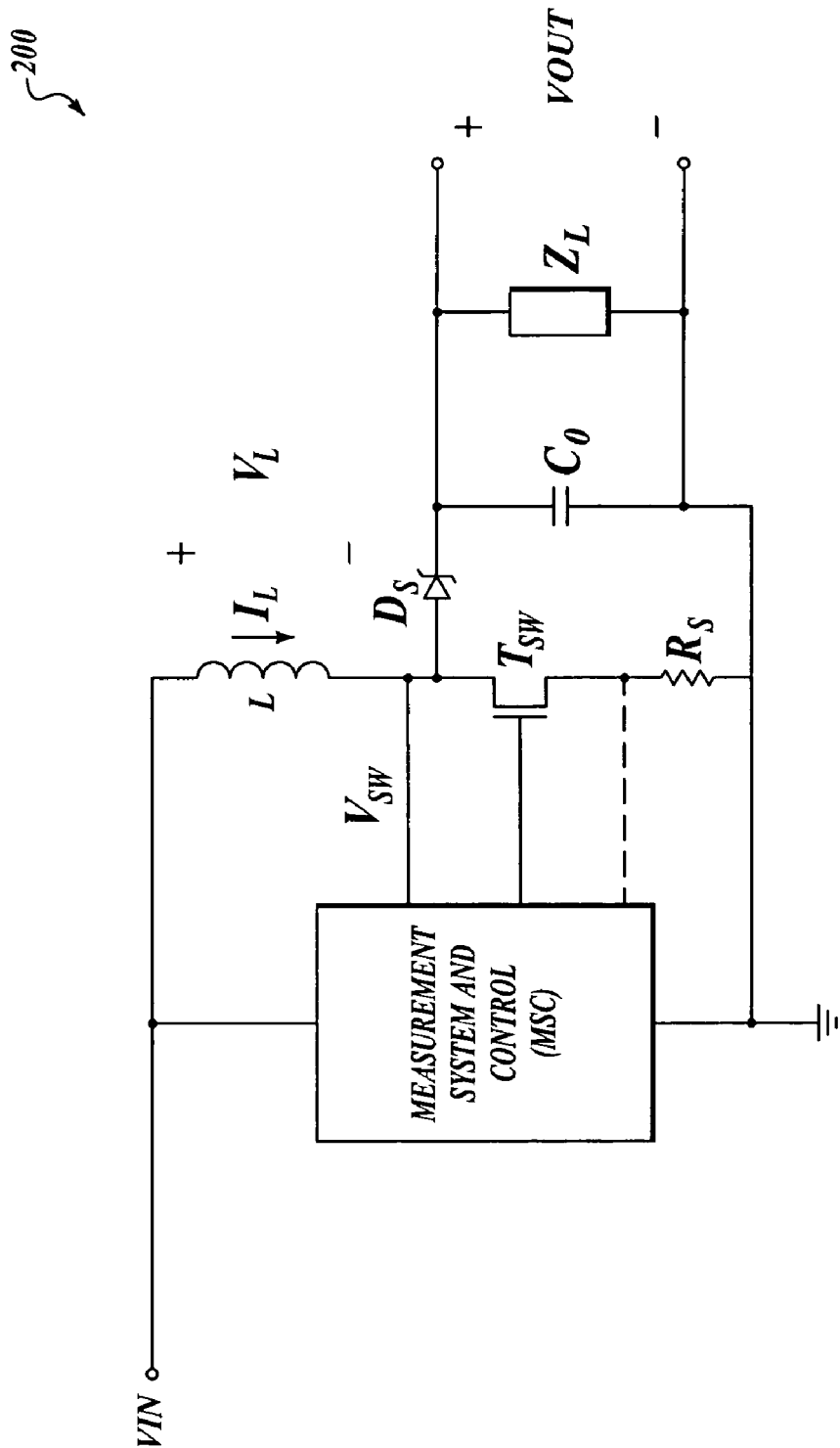
FIG. 2 is an illustration of an example embodiment of a switching converter.

FIG. 2 is an illustration of an example embodiment of a switching converter (200) that is arranged according to an aspect of the present invention. Switching converter 200 includes an inductor (L), a switching transistor ($T_{SW}$), a diode ($D_S$), a capacitor ($C_O$), a load circuit ($Z_L$), and a measurement and system control (MSC) block.

Inductor L is charged when switching transistor $T_{SW}$ is active. Inductor current ($I_L$) is delivered to capacitor $C_O$ and load circuit $Z_L$ via diode $D_S$ when transistor $T_{SW}$ is inactive. In a normal operating mode, the MSC block is arranged to actuate switching transistor $T_{SW}$ such that inductor L is periodically charged. The MSC block is further arranged to monitor the voltages and currents associated with inductor L when the switching converter 200 is operated in a measurement mode, and provides a measurement of the inductance value based on those measurements.

The change in inductor voltage ($\Delta V_L$) is determined by monitoring the input voltage ($V_{IN}$) and the switch voltage ($V_{SW}$). In one example embodiment, the change in inductor current ($\Delta I_L/\Delta t$) is determined by monitoring the change in voltage across the switching transistor ($\Delta V_{DS}$) and calculating: $(\Delta I_L/\Delta t)=(\Delta V_{DS}/\Delta t)/\text{rdson}$, where rdson is the on resistance of switching transistor $T_{SW}$. An optional resistor ($R_S$) may be placed in series with switching transistor $T_{SW}$ to facilitate measurement of the inductor current.

Figure 3:
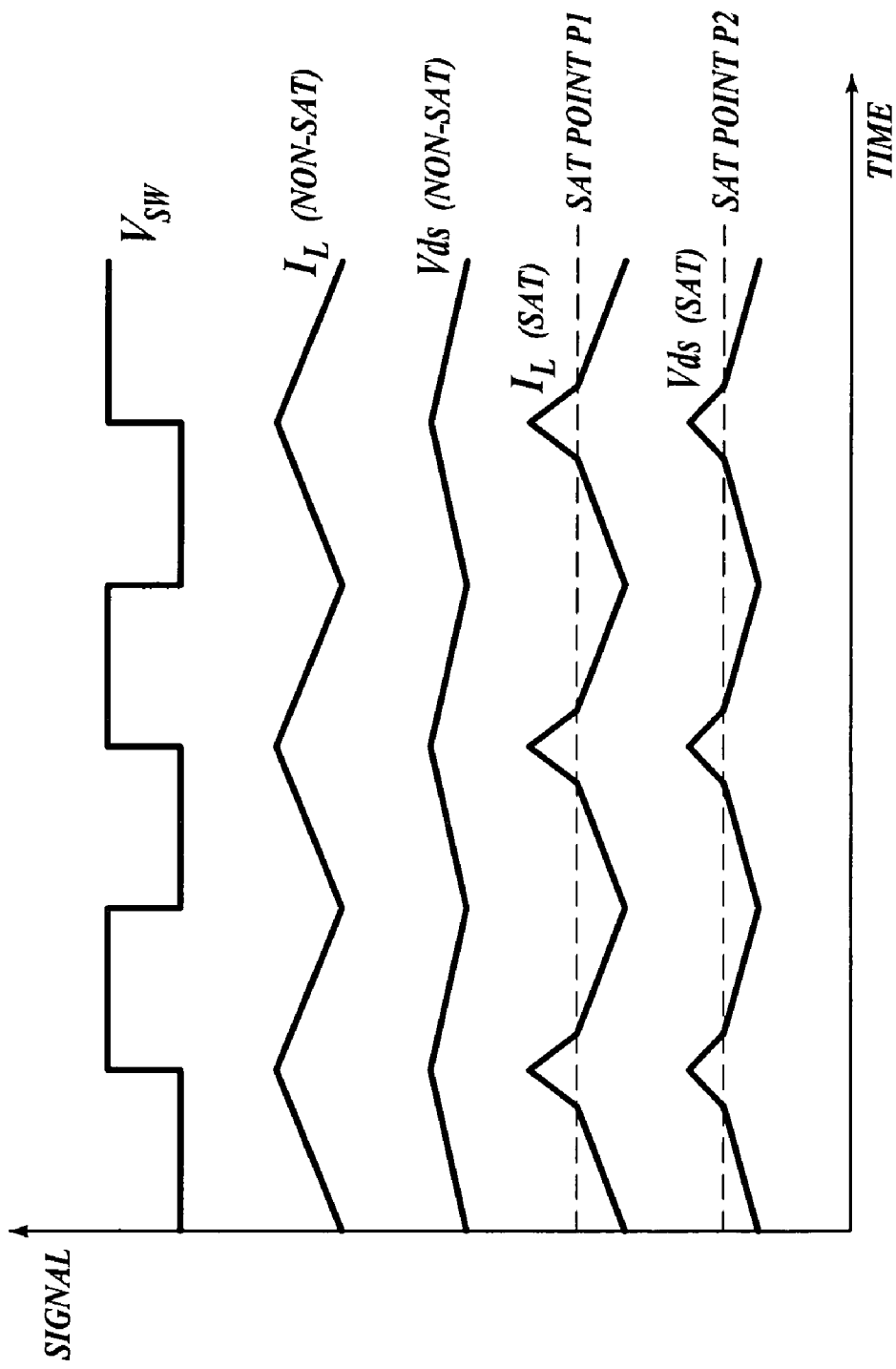
FIG. 3 is an illustration of example waveforms for a switching converter.

FIG. 3 is an illustration of example waveforms for a switching converter such as that illustrated in FIG. 2. Ideally, the inductor does not reach a saturation point and the inductor current ($I_L$) and the voltage across transistor $T_{SW}$ ($V_{DS}$) linearly change proportional to the value of the inductor. The non-ideal effects of inductor saturation are also illustrated as the inductor current ($I_L$) and the voltage across transistor $T_{SW}$ ($V_{DS}$) experience a measurable change in slope when the saturation points ($P_1$ and $P_2$) are reached. The voltage across resistor $R_S$ (when found in circuit 200) has the same shape as $V_{DS}$.

Figure 4:
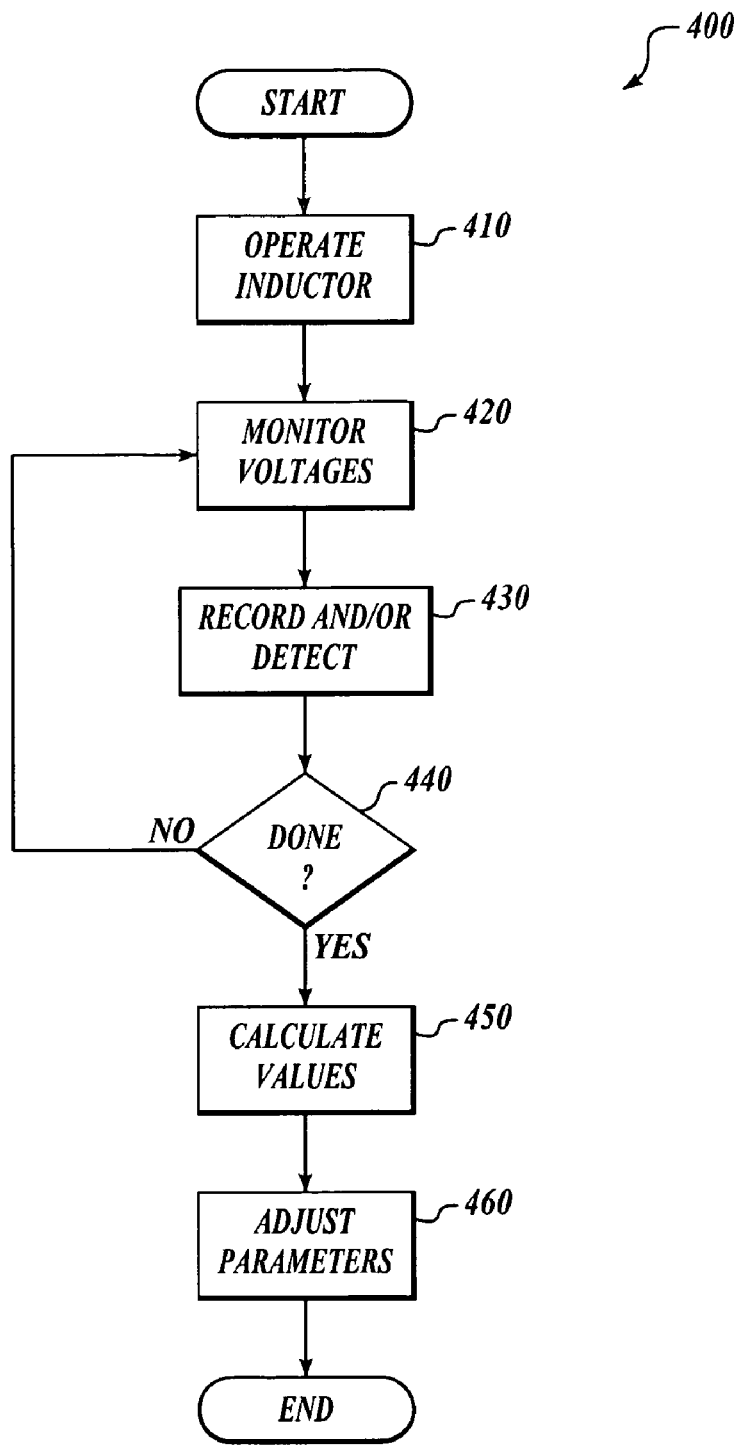
FIG. 4 is an illustration of a procedural flow for an example measurement system.

FIG. 4 is an illustration of a procedural flow for an example measurement system that is arranged according to an aspect of the present invention. After the measurement mode is activated by some triggering event, processing continues at block 410 where the inductor is operated for one or more cycles. At block 420, voltages (e.g., $V_{IN}$, $V_{SW}$, $V_{DS}$, $V_{RS}$, etc.) associated with the inductor are monitored (420) while the inductor is operated. At block 430, the monitored voltages are recorded and/or used to detect the saturation point (depending on the circuit implementation). From decision block 440, the process returns to block 420 when additional monitoring is necessary. Processing continues to block 450 when no additional voltages need be monitored. At block 450 values associated with the inductor (e.g., inductance value, slew rate, saturation point, etc.) are calculated. The calculated values can be used by other circuits or systems to adjust one or more parameters (e.g., current limit, etc).

In one example, voltages are monitored by an analog-type circuit that detects the change in slope associated with the current and/or voltage associated with the inductor. The change in rate associated with the inductor voltages and/or currents indicates that the saturation point has been reached for the inductor. A feedback mechanism can be utilized to activate a clamp circuit or a current limit when the inductor current begins to peak rapidly.

In another example, the inductor voltages are monitored by an analog-to-digital converter. In this example, either the digital values can be recorded in a memory and later retrieved for calculation purposes, or the digital values can be evaluated in real time to determine the rate of change in the voltages. In a further example, the digital values can be processed (e.g., averaged, throwing out extreme values, filtered, etc.) over many operating cycles of the inductor to minimize the effects of noise and switching transients on the measurement values. The processing of the digital values can be provided as a post-processing function or in real-time based on the processing power of the system implementation.

Figure 5:
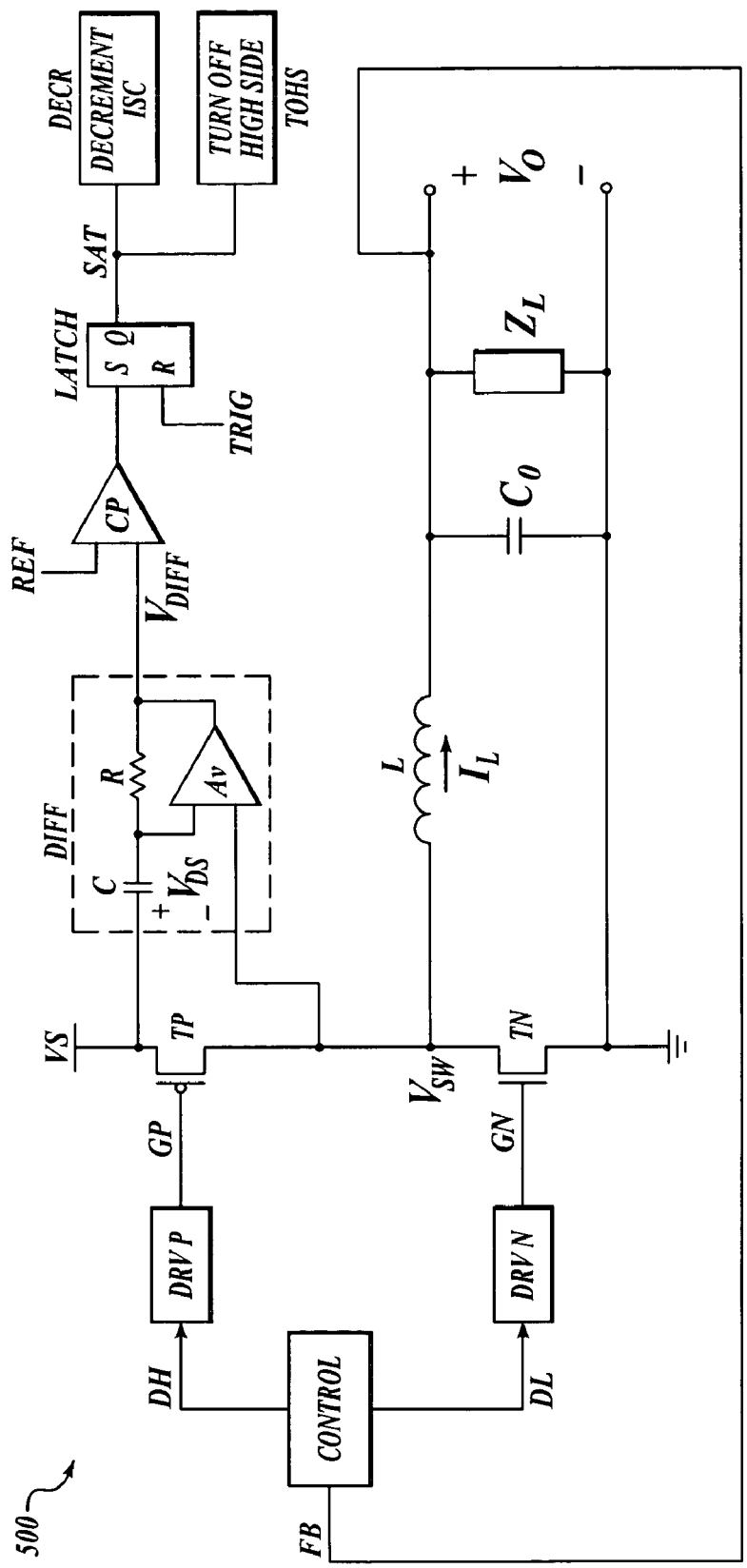
FIG. 5 illustrates another example embodiment of a switching converter with analog differentiator processing system.

FIG. 5 illustrates another example embodiment of a switching converter (500) that is arranged in accordance with an aspect of the present invention. Switching converter 500 is buck-type converter that includes a p-type transistor ($T_P$), and n-type transistor ($T_N$), p and n-type drivers ($DRV_P$, $DRV_N$), a controller (CNTL), a differentiator (DIFF), a comparator (CP), an SR-type latch (LATCH), a decrement circuit (DECR), a high-side turn-off circuit (TOHS), an inductor (L), a capacitor ($C_O$), and a load circuit ($Z_L$).

The controller (CNTL) is arranged to provide drive signals $D_H$ and $D_L$ to drivers $DRV_P$ and $DRV_N$, respectively. Driver $DRV_P$ provides a gate control signal ($G_P$) to p-type transistor $T_P$, while driver $DRV_N$ provides another gate control signal ($G_N$) to n-type transistor $T_N$. The p-type transistor ($T_P$) is arranged to operate as a high side switch that couples the inductor (L) to the high power source ($V_S$). The n-type transistor ($T_N$) is arranged to operate as a low side switch that couples the inductor (L) to the low power source (GND). Capacitor $C_O$ is coupled in parallel with load circuit $Z_L$, which provide a feedback signal (FB) from $V_O$ to the controller (CNTL).

An example differentiator illustrated in FIG. 5 includes a capacitor (C), a resistor (R), and an amplifier ($A_V$). The differentiator is arranged to monitor the drain-source voltage ($V_{DS}$) of p-type transistor $T_P$ and provide a signal ($V_{DIFF}$) that is proportional to $\Delta V_{DS}/\Delta t$. Comparator CP is arranged to set the SR-type latch when signal $V_{DIFF}$ exceeds a reference level (REF), indicating that inductor L is reaching saturation. The SR-type latch is reset by a trigger signal (TRIGG). The decrement circuit (DECR) is arranged to adjust parameters such as current limit in the circuit such that saturation is avoided. The high-side turn-off circuit (TOHS) is arranged to shut down the high-side switch (transistor $T_P$) to prevent saturation. Other parameter adjustment circuits may also be coupled to the output of the SR-type latch when saturation is detected.

Figure 6:
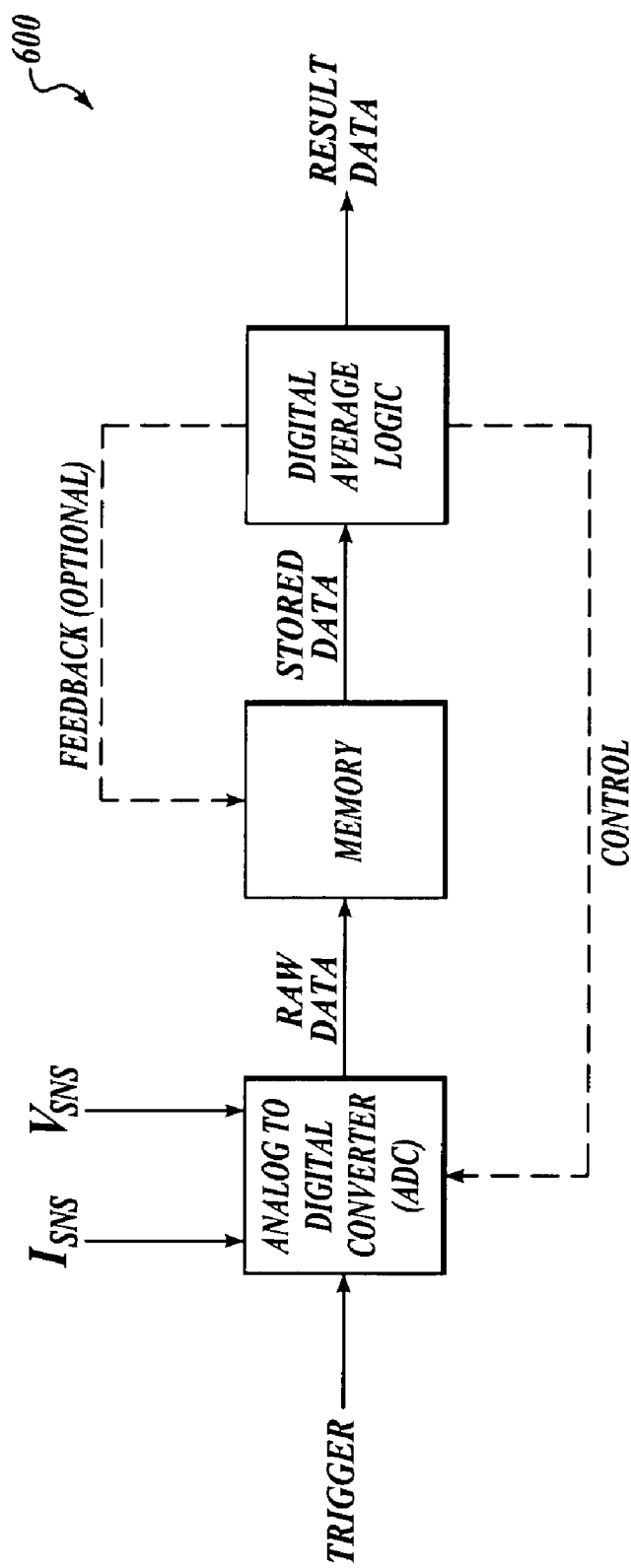
FIG. 6 illustrates an example of a digital processing circuit, arranged in accordance with aspects of the present invention.

FIG. 6 illustrates an example of a digital processing circuit (600) that is arranged in accordance with aspects of the present invention. The digital processing circuit (600) includes an analog-to-digital converter (ADC) circuit, a memory circuit, and a digital processing logic (DPL) circuit. The ADC circuit is activated by a trigger mechanism (TRIGG) and converts a series of measurement signals (ISNS, VSNS, etc) to a data stream (raw data). The data stream is received by the memory circuit for storage. Data in the memory circuit can be retrieved by the DPL circuit for further processing.

In one example, the memory circuit stores sampled data points that are utilized to find the value of $\Delta V_{DS}/\Delta t$, where the DPL circuit is arranged to calculate the value after all of the sampled points are stored. In another example, the memory circuit stores values that correspond to an average value, and the DPL circuit calculates a running average. The DPL circuit can further be arranged to: locate the saturation point of the inductor, filter noise from the sampled data, discard anomalous data from the sampled data points, determine an appropriate current limit, as well as other provide other calculations.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for measuring a parameter associated with an inductor in a circuit, the method comprising:
    charging the inductor with an input voltage;
    monitoring voltages that are associated with the inductor;
    determining an inductor current and an inductor voltage from monitored voltages; and
    calculating the parameter that is associated with the inductor from at least one of the time rate of change of the inductor current and the time rate of change of the inductor voltage; wherein calculating the parameter that is associated with the inductor further comprises at least one of: adjusting a current limit for the inductor, calculating an on-time for a switching device, filtering noise from the monitored voltages, discarding anomalies from the monitored voltages, determining an inductance value associated with the inductor, determining a resistance value associated with the inductor, determining an inductor type that is associated with the inductor, adjusting switching times in a switched mode power-supply, determining a saturation point in the inductor, and adjusting a compensation that is associated with the circuit.

2. A method for measuring a parameter associated with an inductor in a circuit, the method comprising:
    charging the inductor with an input voltage;
    monitoring voltages that are associated with the inductor;
    determining an inductor current and an inductor voltage from monitored voltages; and
    calculating the parameter that is associated with the inductor from at least one of the time rate of change of the inductor current and the time rate of change of the inductor voltage; wherein calculating the parameter that is associated with the inductor further comprises: detecting a change in the inductor current and determining a saturation point for the inductor when the inductor current changes from a first slope to a second slope, wherein the first slope corresponds to a time rate of change associated with the current in the inductor when the inductor is non-saturated, and wherein the second slope corresponds to a time rate of change associated with the inductor current when the inductor is saturated.

3. A method for measuring a parameter associated with an inductor in a circuit, the method comprising:
    charging the inductor with an input voltage during a charging cycle for the inductor;
    monitoring voltages that are associated with the inductor during the charging cycle;
    determining an inductor current and an inductor voltage from the monitored voltages; and
    calculating the parameter that is associated with the inductor from at least one of the time rate of change of the inductor current and the time rate of change of the inductor voltage.

4. The method of claim 3 further comprising: changing a control parameter that is associated with the circuit in response to at least one of: the calculated parameter, the inductor current, and the inductor voltage.

5. The method of claim 3, further comprising charging and discharging the inductor over multiple cycles, wherein monitoring voltages corresponds to monitoring the voltages over the multiple cycles of charging and discharging the inductor.

6. The method of claim 3, further comprising storing the monitored voltages in a memory as stored data, and wherein calculating the parameters further comprises retrieving the stored data from the memory.

7. The method of claim 3 wherein monitoring voltages that are associated with the inductor comprises: coupling a current from the inductor to a resistive means, and sensing a voltage associated with the resistive means.

8. The method of claim 3 wherein monitoring voltages that are associated with the inductor comprises: selectively coupling a current from the inductor to a resistor circuit when the inductor is charging with the input voltage, and sensing a voltage associated with the resistor circuit.

9. The method of claim 3 wherein monitoring voltages that are associated with the inductor comprises: selectively coupling a current from the inductor through a transistor circuit when the inductor is charging with the input voltage, and measuring a voltage across the transistor circuit.

10. The method of claim 3 wherein monitoring voltages that are associated with the inductor comprises: selectively coupling a current from the inductor through a transistor circuit that is coupled to a resistor circuit when the inductor is charging with the input voltage, and measuring a voltage across at least one of the transistor circuit and the resistor circuit.

11. The method of claim 3 wherein monitoring voltages that are associated with the inductor comprises: selectively coupling a current from the inductor to a resistor circuit when the inductor is charging with the input voltage, and sensing a voltage associated with the resistor circuit.

12. The method of claim 3, wherein calculating the parameter that is associated with the inductor further comprises determining a saturation point in the inductor.

13. The method of claim 3, wherein calculating the parameter that is associated with the inductor further comprises adjusting at least one switching time associated with a switched mode power-supply.

14. The method of claim 3, wherein monitoring voltages that are associated with the inductor comprises: sampling a voltage associated with the inductor; and wherein determining an inductor current and an inductor voltage from monitored voltages comprises: calculating the inductor current and the inductor voltage from the sampled voltage.

15. The method of claim 14, wherein sampling the voltage associated with the inductor comprises: sampling the voltage associated with the inductor with an analog-to-digital converter circuit.

16. The apparatus of claim 3, wherein monitoring voltages that are associated with the inductor comprises: sensing voltages with an analog-to-digital converter to provide sampled data; and wherein determining the inductor current and the inductor voltage from the monitored voltages comprises: digitally processing the sampled data.

17. The method of claim 16, wherein digitally processing the sampled data comprises at least one of: storing the sampled data in a memory circuit, applying digital signal processing to the sampled data, and digitally averaging at least a portion of the sampled data.

* * * * *